United States Patent
Amino

(10) Patent No.: US 9,530,383 B2
(45) Date of Patent: Dec. 27, 2016

(54) DISPLAY APPARATUS AND DRIVING METHOD THEREOF

(71) Applicant: SAMSUNG DISPLAY CO., LTD., Yongin, Gyeonggi-Do (KR)

(72) Inventor: Tadashi Amino, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 113 days.

(21) Appl. No.: 14/302,214

(22) Filed: Jun. 11, 2014

(65) Prior Publication Data
US 2015/0130782 A1  May 14, 2015

(30) Foreign Application Priority Data

Nov. 8, 2013  (KR) .......................... 10-2013-0135480

(51) Int. Cl.
*G06F 3/038* (2013.01)
*G09G 5/18* (2006.01)
(Continued)

(52) U.S. Cl.
CPC ................. *G09G 5/18* (2013.01); *H04N 19/12* (2014.11); *H04N 19/146* (2014.11); *H04N 19/46* (2014.11)

(58) Field of Classification Search
CPC ............ G06F 3/038; G09G 5/00; G09G 3/10; G09G 5/10; G09G 3/36; G06K 9/00; G06K 9/36; G06K 9/46; G06K 9/72
(Continued)

(56) References Cited

U.S. PATENT DOCUMENTS

| | | | |
|---|---|---|---|
| 2007/0183248 A1* | 8/2007 | Matsutani | G06F 13/28 365/230.03 |
| 2007/0196023 A1* | 8/2007 | Hama | H04N 1/41 382/232 |

(Continued)

FOREIGN PATENT DOCUMENTS

| | | |
|---|---|---|
| JP | 9-152574 | 6/1997 |
| JP | 2010-96951 | 4/2010 |

(Continued)

OTHER PUBLICATIONS

Korean Patent Abstracts, Publication No. 1020060013728 A, dated Feb. 14, 2006, for corresponding Korean Patent 10-0582381.
(Continued)

*Primary Examiner* — Pegeman Karimi
(74) *Attorney, Agent, or Firm* — Lewis Roca Rothgerber Christie LLP

(57) ABSTRACT

A display device includes: a display panel comprising a plurality of pixels coupled to a plurality of gate lines and a plurality of data lines, respectively; a gate driver configured to drive the plurality of gate lines; a data driver configured to drive the plurality of data lines; and a timing controller configured to control the gate driver and the data driver and to provide the data driver with a data signal generated by compressing an image signal received from an external device, wherein the timing controller is configured to compress the image signal according to a first compression scheme and a second compression scheme to generate a first compression signal and a second compression signal, respectively, and wherein the timing controller is configured to select whichever one, from among the first compression signal and the second compression signal, that has a relatively narrower bit width as the data signal.

13 Claims, 10 Drawing Sheets

(51) Int. Cl.
*H04N 19/46* (2014.01)
*H04N 19/12* (2014.01)
*H04N 19/146* (2014.01)

(58) Field of Classification Search
USPC ................................ 345/204, 211, 212, 213
See application file for complete search history.

(56) References Cited

U.S. PATENT DOCUMENTS

| | | | | |
|---|---|---|---|---|
| 2009/0322713 | A1* | 12/2009 | Furihata | H04N 19/186 345/204 |
| 2010/0315406 | A1* | 12/2010 | Nose | G09G 3/20 345/212 |
| 2012/0120043 | A1* | 5/2012 | Cho | G09G 3/2092 345/211 |
| 2013/0314384 | A1* | 11/2013 | Tsai | G09G 5/18 345/204 |
| 2014/0022221 | A1* | 1/2014 | Furihata | G09G 3/003 345/204 |

FOREIGN PATENT DOCUMENTS

| | | |
|---|---|---|
| JP | 2012-109970 | 6/2012 |
| KR | 10-0582381 | 5/2006 |
| KR | 10-1127844 | 3/2012 |
| KR | 10-2012-0052739 | 5/2012 |
| KR | 10-2013-0064938 | 6/2013 |

OTHER PUBLICATIONS

Korean Patent Abstracts, Publication No. 1020060133727 A, dated Dec. 27, 2006, for corresponding Korean Patent 10-1127844.

\* cited by examiner

DISPLAY APPARATUS AND DRIVING METHOD THEREOF

CROSS-REFERENCE TO RELATED APPLICATION

This application claims priority to and the benefit of Korean Patent Application No. 10-2013-0135480 filed Nov. 8, 2013, in the Korean Intellectual Property Office, the entire contents of which are hereby incorporated by reference.

BACKGROUND

1. Field

Aspects of embodiments of the present invention relate to a display device and a driving method thereof.

2. Description of the Related Art

Display devices may include a liquid crystal display, a field emission display, a plasma display panel, an organic light emitting diode (OLED) display, and the like.

Such display devices are included in image display systems (e.g., televisions, computer monitors, etc.) and may display, for example, moving pictures, images, and letters. For example, an active matrix liquid crystal display device that drives liquid crystal cells using thin film transistors (TFTs) may have characteristics such as relatively excellent image quality and relatively low power consumption. Increased screen sizes and improvements in high-definition image display have been developed recently due to improvements in mass production techniques and research and development output.

As the size of display panels increases, however, additional integrated circuits for driving display panels may be required.

SUMMARY

According to aspects of embodiments of the present invention, a display device includes a display panel comprising a plurality of pixels coupled to a plurality of gate lines and a plurality of data lines, respectively; a gate driver configured to drive the plurality of gate lines; a data driver configured to drive the plurality of data lines; and a timing controller configured to control the gate driver and the data driver and to provide the data driver with a data signal generated by compressing an image signal received from an external device, wherein the timing controller is configured to compress the image signal according to a first compression scheme and a second compression scheme to generate a first compression signal and a second compression signal, respectively, and wherein the timing controller is configured to select whichever one, from among the first compression signal and the second compression signal, that has a relatively narrower bit width as the data signal.

The timing controller may include: a first de-compression circuit configured to de-compress the data signal to generate a first de-compression data signal before compression; and a memory configured to store the first de-compression data signal.

The timing controller may include: a first compressor configured to compress the image signal according to the first compression scheme and to output the first compression signal; a second compressor configured to receive the image signal and the first de-compression data signal from the memory and to compress the image signal according to the second compression scheme and to output the second compression signal; and a compression selector configured to select whichever one, from among the first compression signal and the second compression signal, that has the relatively narrower bit width as the data signal.

The first compressor may be configured to output the first compression signal using a difference between image signals corresponding to a group of pixels, adjacent along a first direction, from among the plurality of pixels.

The second compressor may be configured to output the second compression signal using a difference between the image signal and a previous image signal.

The compression selector may be configured to add a flag bit corresponding to one selected from the first compression signal and the second compression signal to the data signal, and to transfer a resultant signal to the data driver.

The first de-compression circuit may include: a bit width restoration unit configured to restore a bit width of the data signal; a delay configured to delay a previous image signal received from the memory; a de-compressor configured to output a de-compression signal based on the previous image signal delayed by the delay and the data signal the bit width of which is restored by the bit width restoration unit; and a first de-compression selector configured to store one of the de-compression signal and the data signal in the memory based on the flag bit.

The data driver may include: a second de-compression circuit configured to de-compress the data signal and to output a second de-compression data signal as a de-compression result; a shift register configured to store the second de-compression data signal; and a driver circuit configured to drive the plurality of data lines based on the second de-compression data signal.

The second de-compression circuit may include: a bit width restoration unit configured to restore a bit width of the data signal; a de-compressor configured to output a de-compression signal based on the second de-compression data signal stored by the shift register and the data signal the bit width of which is restored by the bit width restoration unit; and a second de-compression selector configured to output one of the de-compression signal and the data signal as the second de-compression data signal.

The driver circuit may include: a latch configured to latch the second de-compression data signal; a digital-to-analog converter configured to receive the second de-compression data signal from the latch, convert the second de-compression signal into an analog signal, and output a gradation signal; and an output buffer configured to receive the gradation signal from the digital-to-analog converter and to provide the gradation to the plurality of data lines.

The data signal output from the timing controller may have a fixed bit width.

The data driver may include a plurality of data driver integrated circuits.

According to aspects of embodiments of the present invention, in a driving method of a display device, the driving method may include: receiving an image signal; generating a first compression signal by compressing the image signal according to a first compression scheme; generating a second compression signal by compressing the image signal according to a second compression scheme; and outputting whichever one, from among the first compression signal and the second compression signal that has a relatively narrower bit width, as a data signal.

The outputting may include: adding a flag signal corresponding to one selected from the first compression signal and the second compression signal to the data signal.

The driving method may further include restoring a bit width of the data signal; outputting a de-compression signal based on a previous de-compression data signal and the data signal the bit width of which is restored; and storing the de-compression signal.

According to aspects of embodiments of the present invention, it may be possible to reduce a bit width of a data signal transferred from a timing controller to data driver integrated circuits. Accordingly, the number of the data driver integrated circuits may be minimized or reduced.

BRIEF DESCRIPTION OF THE FIGURES

The above and other aspects of embodiments of the present invention will become apparent from the following description with reference to the following figures, wherein like reference numerals refer to like elements throughout the various figures unless otherwise specified, and wherein.

DETAILED DESCRIPTION

Figure 1:
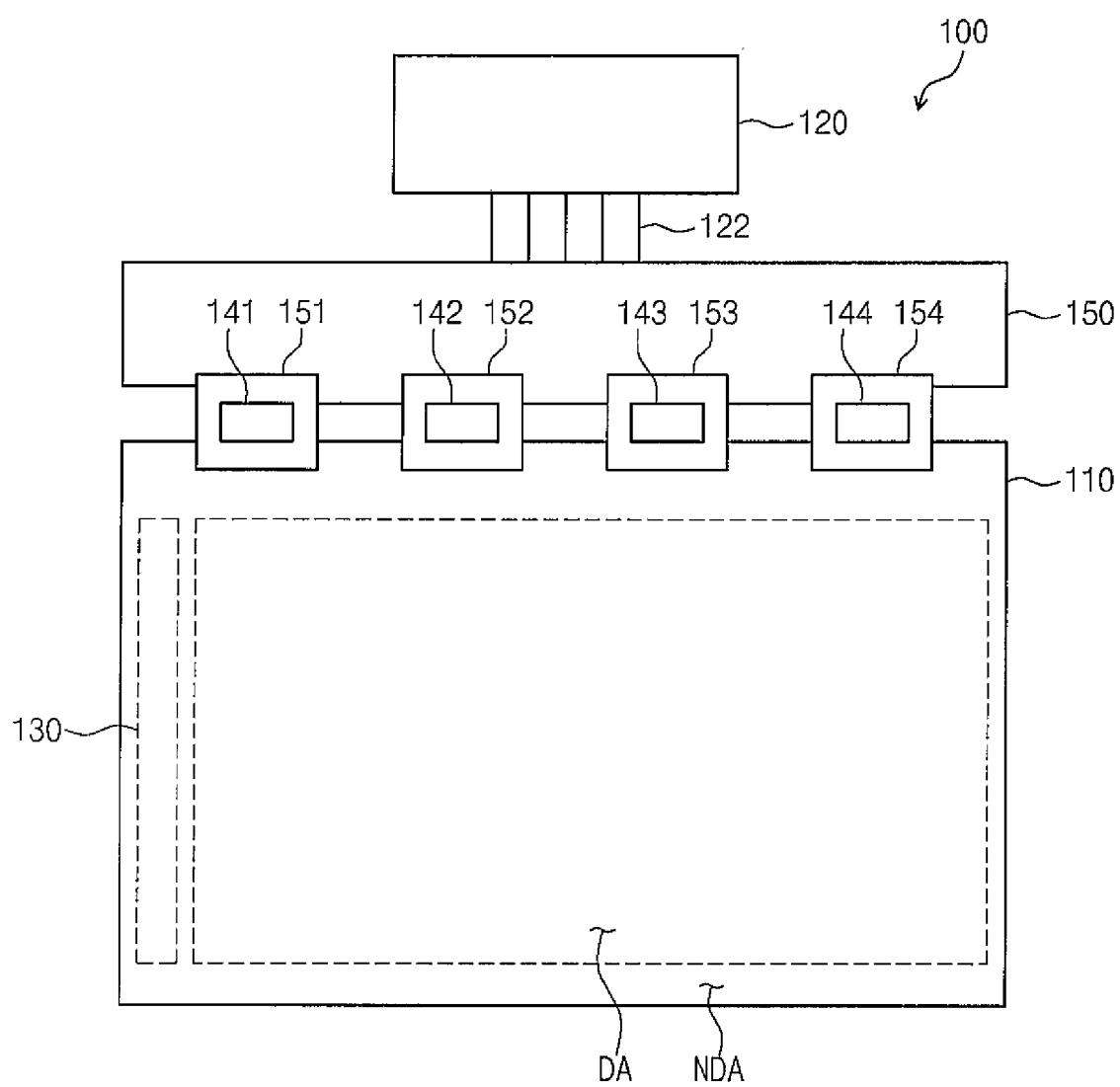
FIG. 1 is a plan view of a display device according to an embodiment of the present invention.

Embodiments will be described in some detail with reference to the accompanying drawings. Embodiments of the present invention, however, may be embodied in various different forms, and should not be construed as being limited only to the illustrated embodiments. Rather, these embodiments are provided as examples so that this disclosure will be more thorough and more complete, and will more fully convey the concepts of the embodiments of the present invention to those skilled in the art. Accordingly, known processes, elements, and techniques are not described with respect to some of the embodiments of the present invention. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the embodiments of the present invention.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing example embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which embodiments of the present invention belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a plan view of a display device according to an embodiment of the present invention.

Referring to FIG. 1, a display device 100 may include a display panel 110, a timing controller 120, a gate driver 130, a printed circuit board 150, and data driver circuits 151 to 154.

The display device 100 may be a liquid crystal display (LCD) device, a plasma panel display (PDP) device, an organic light emitting diode (OLED) display device, a field emission display (FED) device, or other suitable display device.

The timing controller 120 may be electrically coupled to the printed circuit board 150 through a cable 122. The timing controller 120 may provide the data driver circuits 151 to 154 with a data signal and a control signal through the cable 122. The control signal transferred from the timing controller 120 to the data driver circuits 151 to 154 may include a horizontal synchronization start signal, a clock signal, and a line latch signal.

The printed circuit board 150 may include various circuits for driving the display panel 110. The printed circuit board 150 may include a plurality of lines for electrically coupling the timing controller 120 to the data driver circuits 151 to 154.

Each of the data driver circuits 151 to 154 may be implemented by a tape carrier package (TCP) or a chip on film (COF), and data driver integrated circuits 141 to 144 may be mounted on the data driver circuits 151 to 154, respectively. Each of the data driver integrated circuits 141 to 144 may drive a plurality of data lines arranged on the display panel 110 in response to a data signal and a control signal from the timing controller 120. The data driver integrated circuits 141 to 144 may be directly mounted on the display panel 110, not the printed circuit board 150.

The display panel 110 may include a display area DA having a plurality of pixels PX and a non-display are NDA adjacent to the display area DA. The display area DA may be an area on which images are displayed, and the non-display are NDA may be an area on which images are not displayed. The display panel 110 may be formed of a glass substrate, a silicon substrate, or a film substrate.

The gate driver 130 may be implemented by a circuit using an ASG (Amorphous silicon gate) using an amorphous Silicon Thin Film Transistor (a-Si TFT), oxide semiconductor, crystalline semiconductor, polycrystalline semiconductor, and the like. The gate driver 130 may be integrated at the non-display area NDA. In other example embodiments, the gate driver 130 may be formed of an integrated circuit and may be provided at one side of the display panel 110.

A resolution of the display panel 110 may be, for example, from 1360×768 HD to 1920×1080 Full HD, or from 1360× 768 HD to 3840×2160 Ultra Full HD.

For example, in embodiments in which a resolution of the display panel 110 is Ultra HD, a frequency of a vertical synchronization signal may be 120 Hz, a horizontal blank period may correspond to 100 pixels, a vertical blank period may correspond to 100 lines, each of R, G, and B signals provided from an external device may be formed of 10 bits, and a transfer speed of a data signal transferred from the timing controller 120 to the data driver integrated circuits 141 to 144 through the printed circuit board 150 may be expressed by an equation: 120 Hz×(3840+200)×(2160+ 100)×10 bit×3 (=32 Gpbs).

In embodiments in which an optimal communication speed is set to 1.5 Gpbs using AiPi (Advanced Intra Panel Interface) as an interface between the timing controller 120 and the printed circuit board 150, at least twenty-two data driver integrated circuits may be required. That is, because a transfer speed of a data signal transferred from the timing controller 120 to the data driver integrated circuits 141 to 144 may be restricted, many data driver integrated circuits may be required. The timing controller 120 according to embodiments of the present invention may compress a data signal to provide it to the data driver integrated circuits 141 to 144. Thus, it may be possible to reduce the number of data driver integrated circuits.

Figure 2:
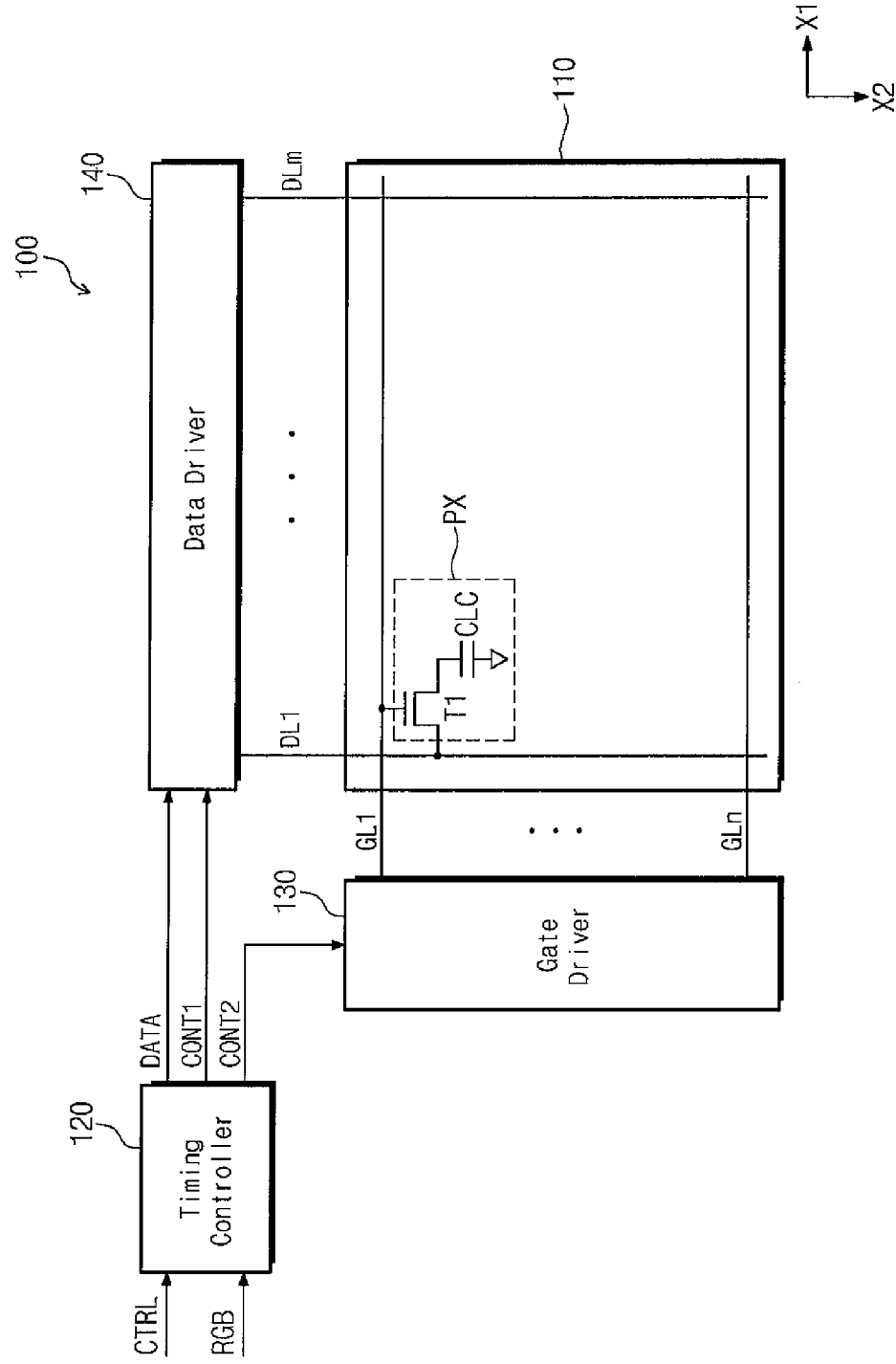
FIG. 2 is a block diagram schematically illustrating the display device shown in FIG. 1.

FIG. 2 is a block diagram schematically illustrating a display device shown in FIG. 1.

Referring to FIG. 2, a display device 100 may include a display panel 110, a timing controller 120, a gate driver 130, and a data driver 140.

The display panel 110 may include a plurality of data lines DL1 to DLm, a plurality of gate lines GL1 to GLn arranged to intersect with the data lines DL1 to DLm, and a plurality of pixels PX respectively arranged at intersections of the data lines DL1 to DLm and the gate lines GL1 to GLn. The plurality of data lines DL1 to DLm may be isolated from the plurality of gate lines GL1 to GLn. Each of the pixels PX may include a switching transistor T1 coupled to a corresponding to data line and a corresponding gate line and a crystal capacitor CLC coupled to the switching transistor T1.

The timing controller 120 may receive an image signal RGB and control signals CTRL for controlling a display of the image signal RGB. The control signals CTRL may include a vertical synchronization signal, a horizontal synchronization signal, a main clock signal, a data enable signal, etc. Based on the control signals CTRL, the timing controller 120 may provide a data signal and a first control signal CONT1 to the data driver 140 and may provide a second control signal CONT2 to the gate driver 130. The data signal DATA may be generated by processing the image signal RGB to be suitable for an operation condition of the display panel 110. The first control signal CONT1 may include a horizontal synchronization start signal, a clock signal, and a line latch signal, and the second control signal CONT2 may include a vertical synchronization start signal and an output enable signal. In example embodiments, the timing controller 120 may compress the image signal RGB to output a data signal DATA the bit width of which is narrower than that of the image signal RGB. This will be more fully described later.

The gate driver 130 may drive the plurality of gate lines GL1 to GLn in response to the second control signal CONT2 from the timing controller 120. The data driver 140 may output gradation voltages for driving the data lines DL1 to DLm according to the data signal DATA and the first control signal CONT1 from the timing controller 120. The data driver 140 may include data driver integrated circuits 141 to 144 shown in FIG. 1.

The gate driver 130 may apply a gate driving signal having a gate on voltage VON to one of the gate lines GL1 to GLn. During application of the gate driving signal, switching transistors T1 coupled to the gate line may be turned on, such that gradation voltages may be provided to the data lines DL1 to DLm from the data driver 140. Here, a period where the gate on voltage VON is applied to a gate line and switching transistors T1 are turned may be referred to as a horizontal period or '1H'.

Figure 3:
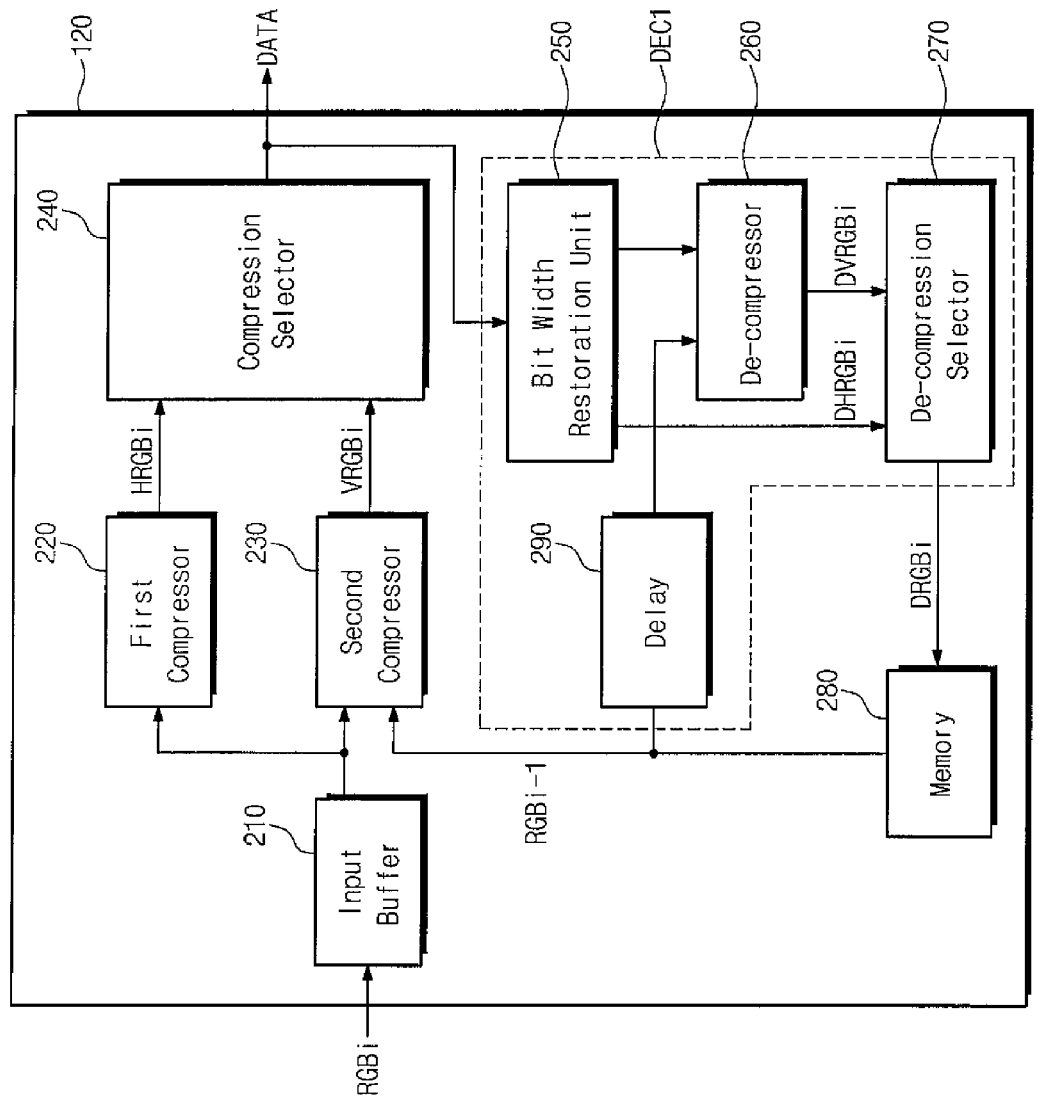
FIG. 3 is a block diagram schematically illustrating the timing controller shown in FIG. 2.

FIG. 3 is a block diagram schematically illustrating a timing controller shown in FIG. 2.

Referring to FIG. 3, a timing controller 120 may include an input buffer 210, a first compressor 220, a second compressor 230, a compression selector 240, a first de-compression circuit DEC1, and a memory 280. For ease of description, an image signal RGB provided from an external graphics processor may be referred to as a current image signal RGBi. The current image signal RGBi may correspond to pixels PX of a display panel 110 (shown, for example, in FIG. 2), respectively. The input buffer 210 may store the current image signal RGBi and may output the current image signal RGBi corresponding to a group of pixels PX to the first compressor 220 and the second compressor 230. For example, the input buffer 210 may concurrently (e.g., simultaneously) provide current image signals RGBi corresponding to adjacent M pixels (M being 4, 8, 12, or 16) to the first compressor 220 and the second compressor 230.

The first compressor 220 may compress current image signals RGBi provided from the input buffer 210 and may output a first compression signal HRGBi as a compression result. In example embodiments, the first compressor 220 may be a variable length coding compressor that encodes a difference between current image signals RGBi corresponding to pixels adjacent along a first direction X1 (shown, for example, in FIG. 2). The first compressor 220 may be characterized in that a compression level is high when correlation (e.g., horizontal correlation) between pixels adjacent along the first direction X1 is high.

The second compressor 230 may receive the current image signal RGBi provided from the input buffer 210 and a previous image signal RGBi-1 provided from the memory 280 and may output a second compression signal VRGBi. In example embodiments, the second compressor 230 may be a variable length coding compressor that encodes a difference between current image signals RGBi corresponding to pixels adjacent in a second direction X2 (refer to FIG. 2). The second compressor 230 may be characterized in that a compression level is high when correlation (e.g., horizontal correlation) between pixels adjacent in the second direction X2 is high.

For example, if the current image signal RGBi is a signal to be provided to pixels PX coupled to an ith gate line GLi, a previous image signal RGBi-1 read from the memory 280 may be a signal obtained by restoring a signal to be provided to pixels PX coupled to a (i−1)th gate line GLi-1. Therefore, the second compressor 230 may encode a difference between pixels adjacent in the second direction X2.

The compression selector 240 may select one of the first compression signal HRGBi from the first compressor 220 and the second compression signal VRGBi from the second compressor 230 and may output the selected signal as a data signal DATA. Here, the selected signal may have a relatively narrow bit width. The first compression signal HRGBi and the second compression signal VRGBi may be variable length coded, so their bit widths may not be constant. The compression selector 240 may convert one selected from the first compression signal HRGBi and the second compression signal VRGBi into the data signal DATA having a fixed bit width. For example, if the first compression signal HRGBi is selected, the compression selector 240 may set a flag bit to '0'. If the second compression signal VRGBi is selected, the compression selector 240 may set a flag bit to '1'.

Also, the compression selector 240 may add a flag signal corresponding to one selected from the first compression signal HRGBi and the second compression signal VRGBi to the data signal DATA and may provide a result to a data driver 140 shown in FIG. 2.

The first de-compression circuit DEC1 may de-compress the data signal DATA to a signal before compression and may output a first de-compression data signal DRGBi. The first de-compression circuit DEC1 may include a bit width restoration unit 250, a de-compressor 260, a de-compression selector 270, and a delay 290. The bit width restoration unit 250 may restore a bit width of the data signal DATA to have a bit width of an image signal RGBi. If the data signal DATA has a flag bit of '0', the bit width restoration unit 250 may perform conversion of a bit width and de-compression based on the data signal DATA, and it may output the first de-compression signal DHRGBi. The bit width restoration unit 250 may output the first de-compression signal DHRGBi that maintains a flag bit included in the data signal DATA.

If the data signal DATA has a flag bit of '1', the bit width restoration unit 250 may convert a bit width of the data signal DATA into a bit width of the image signal RGBi and may output a resultant signal to the de-compressor 260. The delay 290 may delay the previous image signal RGBi-1 and may output the delayed signal to the de-compressor 260. The de-compressor 260 may output a first de-compression signal DVRGBi that is de-compressed according to the previous image signal RGBi-1 delayed by the delay 290 and a signal the bit width of which is restored by the bit width restoration unit 250.

The de-compression selector 270 may select one of the first de-compression signal DHRGBi and the first de-compression signal DVRGBi according to a flag bit included in the first de-compression signal DHRGBi and may store the selected signal in the memory 280 as a first de-compression data signal DRGBi. That is, when a flag signal has a value of '1', the de-compression selector 270 may select the first de-compression signal DHRGBi. When a flag signal has a value of '0', the de-compression selector 270 may select the first de-compression signal DHRGBi as a first de-compression data signal DRGBi.

Figure 4:
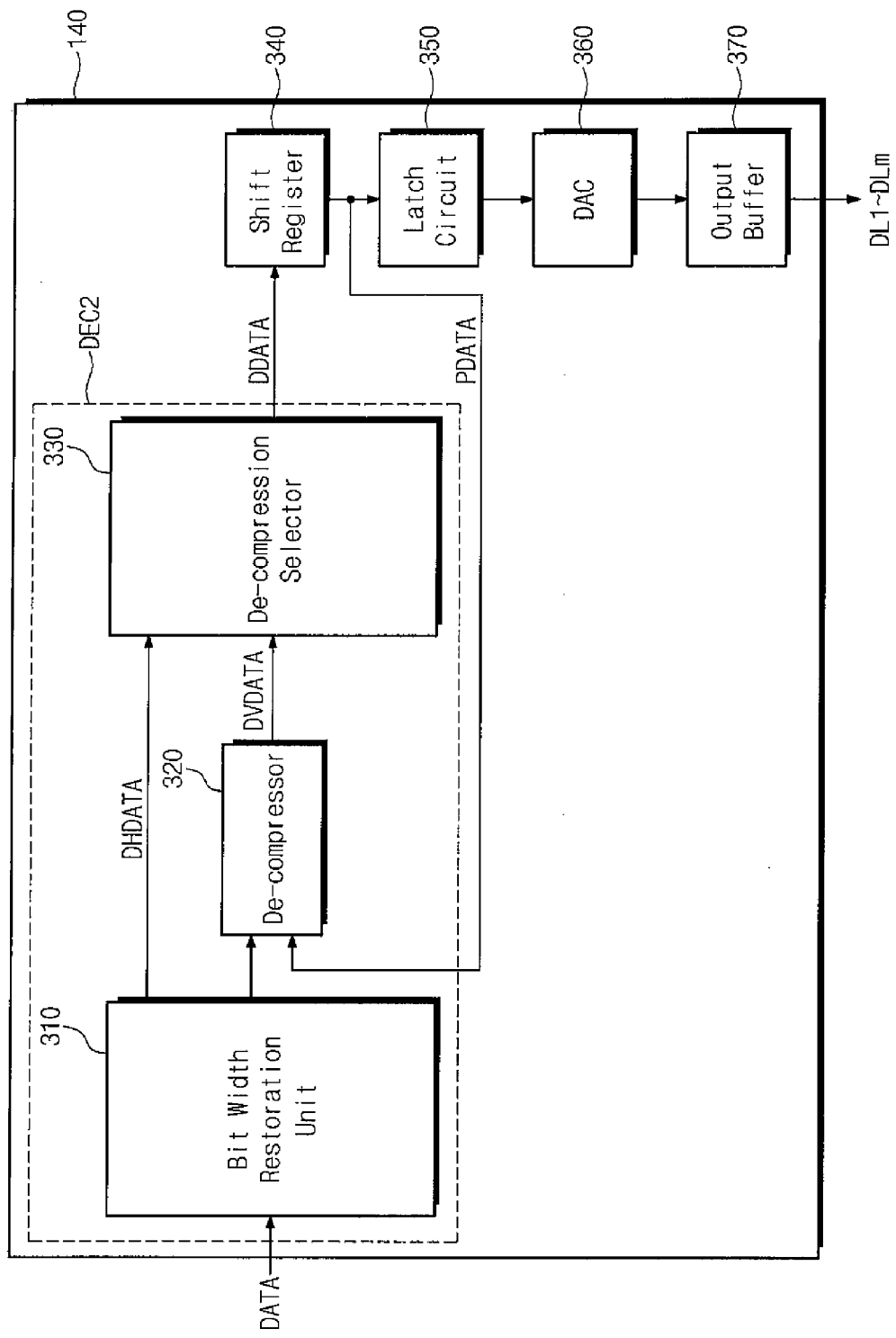
FIG. 4 is a block diagram schematically illustrating the data driver shown in FIG. 2.

FIG. 4 is a block diagram schematically illustrating a data driver shown in FIG. 2.

Referring to FIG. 4, a data driver 140 may include a second de-compression circuit DEC2, a shift register 340, a latch circuit 350, a digital-to-analog converter (DAC) 360, and an output buffer 370.

The second de-compression circuit DEC2 may output a second de-compression data signal DDATA that is a signal obtained by de-compressing a data signal from a timing controller 120 (refer to FIG. 3) to a signal before compression. The second de-compression circuit DEC2 may include a bit width restoration unit 310, a de-compressor 320, and a de-compression selector 330. The bit width restoration unit 310 may convert a bit width of the data signal DATA into a bit width of an image signal RGBi.

If the data signal DATA has a flag bit of '0', the bit width restoration unit 310 may perform conversion of a bit width and de-compression based on the data signal DATA, and it may output the first de-compression signal DHDATA. The bit width restoration unit 310 may output the first de-compression signal DHDATA that maintains a flag bit included in the data signal DATA.

If the data signal DATA has a flag bit of '1', the bit width restoration unit 310 may convert a bit width of the data signal DATA into a bit width of the image signal RGBi and may output a resultant signal to the de-compressor 320. The de-compressor 320 may output a first de-compression signal DVDATA that is de-compressed according to a previous data signal PDATA from the shift register 340 and an output signal provided by the bit width restoration unit 310 that has a bit width that is converted by the bit width restoration unit 310.

The selector 330 may select one of the first de-compression signal DHDATA and the first de-compression signal DVDATA according to a flag bit included in the first de-compression signal DHDATA and may output the selected signal to the shift register 340 as a second de-compression data signal DDATA. That is, when a flag signal has a value of '0', the selector 330 may select the first de-compression signal DHDATA; when a flag signal has a value of '1', the selector 330 may select the first de-compression signal DVDATA as a second de-compression data signal DDATA.

The shift register 340 may sequentially shift and latch the second de-compression data signal DDATA during a horizontal period, that is, 1H. previous data signal PDATA output from the shift register 340 may be latched by a latch circuit 350. The digital-to-analog converter 360 may convert the previous data signal PDATA into a gradation voltage. The output buffer 370 may drive data lines DL1 to DLm (refer to FIG. 2) with the gradation voltage from the digital-to-analog converter 360.

As illustrated in FIGS. 3 and 4, a timing controller 120 may transfer a compressed data signal DATA to a data driver 140, and the data driver 140 may de-compress the compressed data signal DATA such that an image corresponding to the de-compressed image signal is displayed on a display panel 110 (refer to FIG. 2). data signal DATA compressed by the timing controller 120 may be transferred to the data driver 140, so the amount of data signal DATA may be reduced. In this case, it is possible to reduce the number of data driver integrated circuits 141 to 144 of the data driver 140.

Figure 5:
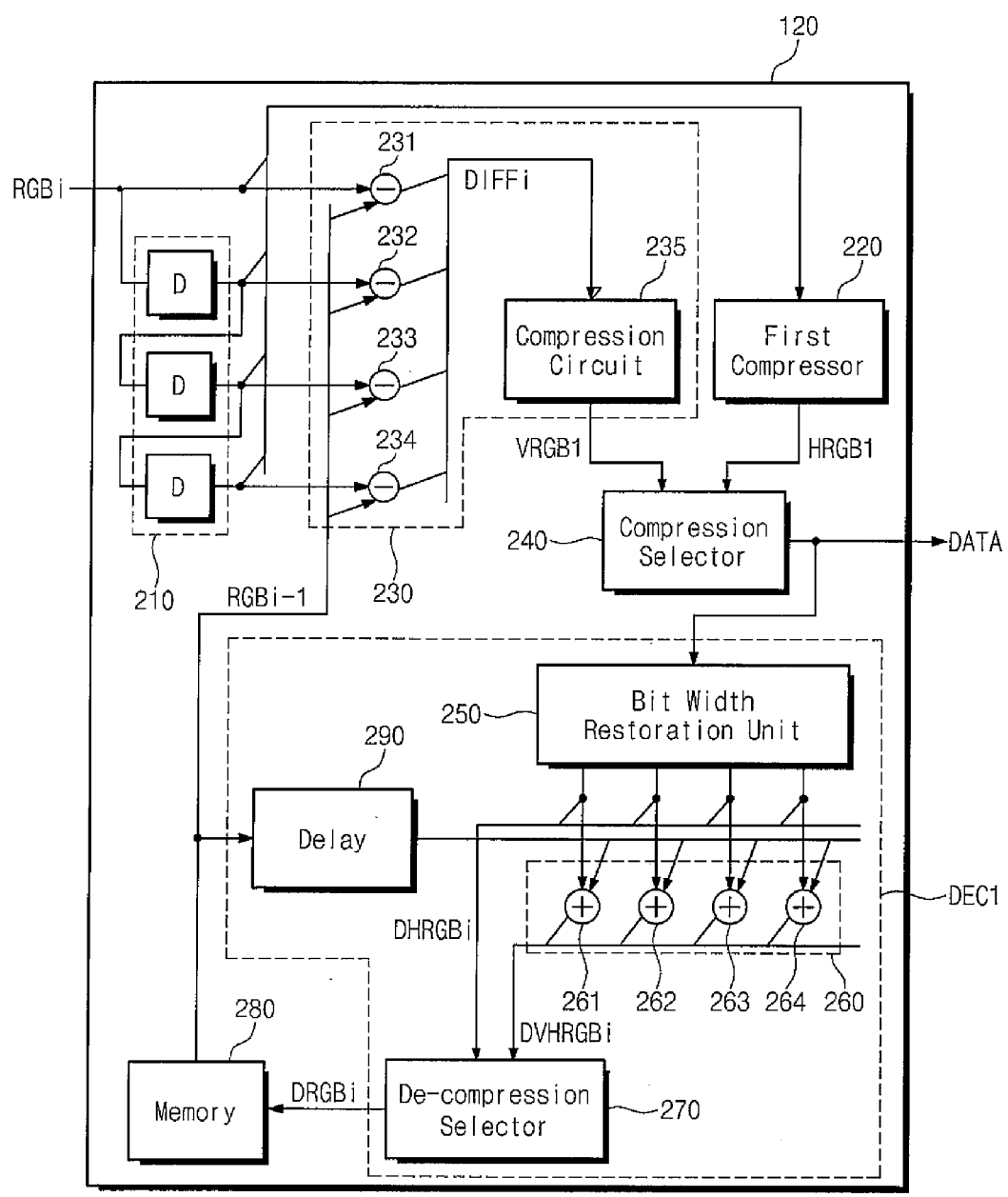
FIG. 5 is a block diagram schematically illustrating an embodiment in which the timing controller shown in FIG. 3 performs a compression operation based on image signals corresponding to four pixels.

FIG. 5 is a block diagram schematically illustrating an embodiment where a timing controller (e.g., shown in FIG. 3) performs a compression operation based on image signals corresponding to four pixels. In FIG. 5, constituent elements that are the same as those of FIG. 3 may be marked by the same reference numerals, and a description thereof may be thus omitted.

Referring to FIG. 5, an input buffer 210 may include three delays (or delay circuits) D that are sequentially coupled to delay a current image signal RGBi. Four current image signals RGBi corresponding to four pixels may be provided to a first compressor 220 and a second compressor 230 through the input buffer 210.

The second compressor 230 may include subtractors (or subtractor circuits) 221 to 224 and a compression circuit 225. Each of the subtractors 221 to 224 may calculate a difference between a current image signal RGBi and a previous image signal RGBi-1 from a memory 280 and may output a difference value DIFFi to the compression circuit 225. The compression circuit 225 may output a second compression signal VRGB1 based on the difference value DIFFi between the current image signal RGBi and the previous image signal RGBi-1 from the memory 280.

The first compressor 220 may compress the current image signals RGBi from the input buffer 210 and may output a first compression signal HRGBi as a compression result. The compression selector 240 may output one, having a relatively narrow bit width, from among the first compression signal HRGBi from the first compressor 220 and the second compression signal VRGBi from the second compressor 230 as a data signal DATA.

A bit width restoration unit 250 of the first de-compression circuit DEC1 may convert a bit width of the data signal DATA into a bit width of an image signal RGBi. If the data signal DATA has a flag bit of '0', the bit width restoration unit 250 may perform conversion of a bit width and de-compression based on the data signal DATA, and it may output the first de-compression signal DHRGBi. The bit width restoration unit 250 may output the first de-compression signal DHRGBi that maintains a flag bit included in the data signal DATA. If the data signal DATA has a flag bit of '1', the bit width restoration unit 250 may convert a bit width of the data signal DATA into a bit width of the image signal RGBi and may output a resultant signal to the de-compressor 260.

The de-compressor 260 may include adders 261 to 264. Each of the adders 261 to 264 may output a first de-compression signal DVRGBi which is de-compressed according to the previous image signal RGBi-1 delayed by a delay 290 and a signal the bit width of which is restored by the bit width restoration unit 250.

The de-compression selector 270 may select one of the first de-compression signal DHRGBi and the first de-compression signal DVRGBi according to a flag bit included in the first de-compression signal DHRGBi and may store the selected signal in the memory 280 as a first de-compression data signal DRGBi.

The following table 1 shows an example of a previous image signal RGBi-1 and a current image signal RGBi corresponding to four adjacent pixels according to some embodiments of the present invention.

TABLE 1

| Previous image signal (RGBi-1) | 0 | 25 | 52 | 85 |
| Current image signal (RGBi) | 0 | 25 | 52 | 85 |

The following table 2 shows bit widths of first and second compression signals HRGBi and VRGBi respectively compressed by first and second compressors 220 and 230 based on a previous image signal RGBi-1 and a current image signal RGBi in the table 1 according to some embodiments of the present invention.

TABLE 2

| HRGBi | DIFFi | 0 | 25 | 27 | 33 |
| | Bit width | 1 | 9 | 9 | 9 |
| VRGBi | DIFFi | 0 | 0 | 0 | 0 |
| | Bit width | 1 | 1 | 1 | 1 |

In the event that a previous image signal RGBi-1 and a current image signal RGBi corresponding to four adjacent pixels of the table 1 are compressed, a first compression signal HRGBi may have a 28-bit width, and a second compression signal VRGBi may have a 4-bit width. If correlation in a second direction X2, that is, vertical correlation is high, a bit width of the second compression signal VRGBi output from the second compressor 230 may be relatively narrower. Thus, a compression selector 240 may output the second compression signal VRGBi output from the second compressor 230 as a data signal DATA.

The following table 3 shows another example of a previous image signal RGBi-1 and a current image signal RGBi corresponding to four adjacent pixels according to some embodiments of the present invention.

TABLE 3

| Previous image signal (RGBi-1) | 85 | 52 | 25 | 22 |
| Current image signal (RGBi) | 90 | 90 | 90 | 90 |

The following table 4 shows bit widths of first and second compression signals HRGBi and VRGBi respectively compressed by first and second compressors 220 and 230 based on a previous image signal RGBi-1 and a current image signal RGBi in the table 3 according to some embodiments of the present invention.

TABLE 4

| HRGBi | DIFFi | 90 | 0 | 0 | 0 |
|---|---|---|---|---|---|
| | Bit width | 9 | 1 | 1 | 1 |
| VRGBi | DIFFi | 3 | 33 | 27 | 3 |
| | Bit width | 9 | 9 | 9 | 9 |

In the event that a previous image signal RGBi-1 and a current image signal RGBi corresponding to four adjacent pixels of the table 3 are compressed, a first compression signal HRGBi may have a 12-bit width, and a second compression signal VRGBi may have a 36-bit width. If correlation along a first direction X1, that is, horizontal correlation is high, a bit width of the first compression signal HRGBi output from the first compressor 220 may be relatively narrower. Thus, the compression selector 240 may output the first compression signal HRGBi output from the second compressor 230 as the data signal DATA.

Figure 6:
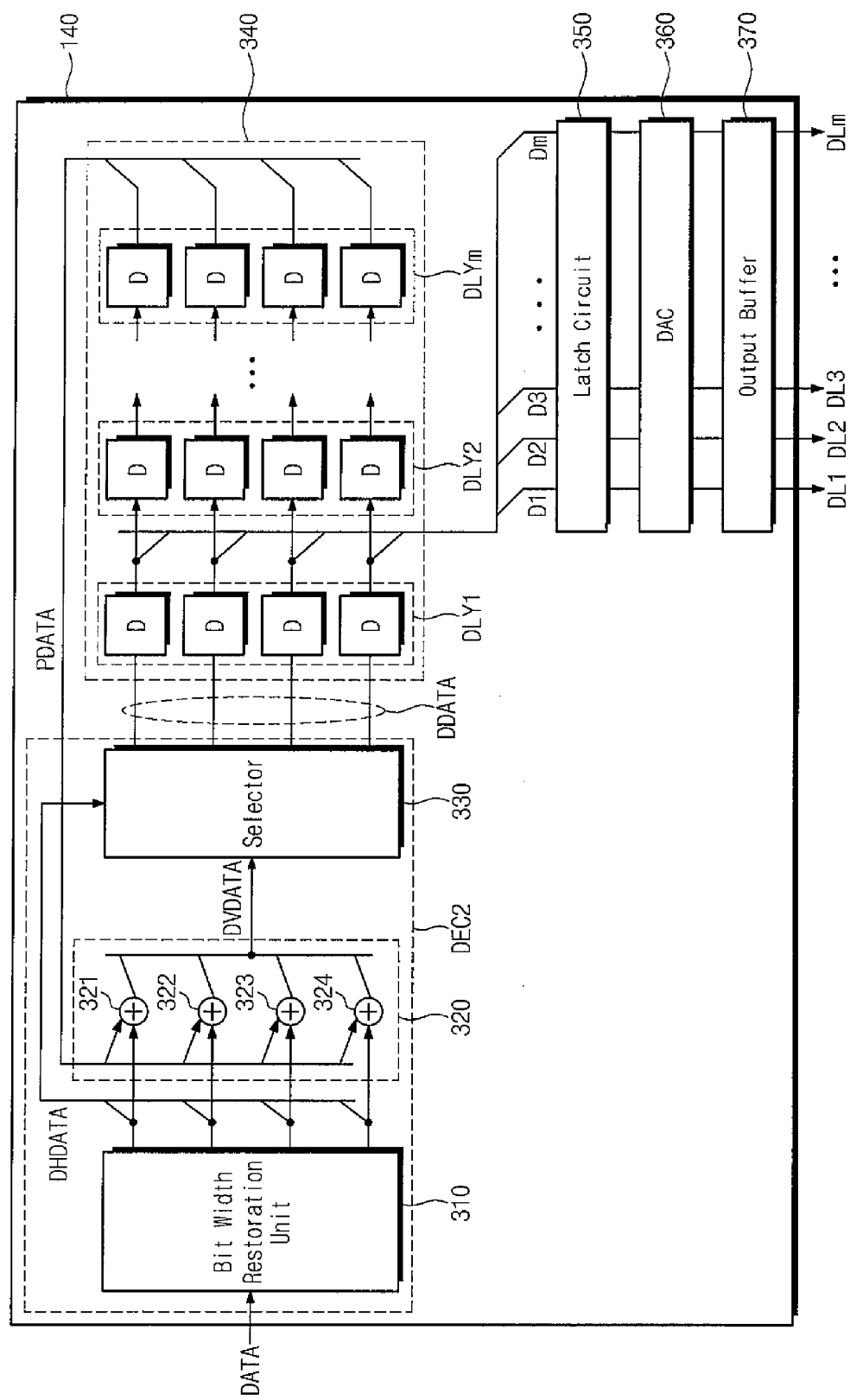
FIG. 6 is a block diagram schematically illustrating an embodiment in which the data driver shown in FIG. 4 performs a de-compression operation based on data signals corresponding to four pixels.

FIG. 6 is a block diagram schematically illustrating an embodiment where a data driver (shown, for example, in FIG. 4) performs a de-compression operation based on data signals corresponding to four pixels. In FIG. 6, constituent elements that are the same as those of FIG. 4 may be marked by the same reference numerals, and some description thereof may be thus omitted.

Referring to FIG. 6, a bit width restoration unit 310 of a second de-compression circuit DEC2 may convert a bit width of a data signal DATA into a bit width of an image signal RGBi. If the data signal DATA has a flag bit of '0', the bit width restoration unit 310 may perform conversion of a bit width and de-compression based on the data signal DATA, and it may output a first de-compression signal DHDATA. The bit width restoration unit 310 may output the first de-compression signal DHDATA that maintains a flag bit included in the data signal DATA.

If the data signal DATA has a flag bit of '1', the bit width restoration unit 310 may convert a bit width of the data signal DATA into a bit width of the image signal RGBi and may output a resultant signal to the de-compressor 320. The de-compressor 320 may include adders 321 to 324. Each of the adders 321 to 324 may output a first de-compression signal DVDATA which is de-compressed according to a previous data signal PDATA from a shift register 340 and a signal the bit width of which is converted by the bit width restoration unit 310.

The selector 340 may select one of the first de-compression signal DHDATA and the first de-compression signal DVDATA according to a flag bit included in the first de-compression signal DHDATA and may output the selected signal to the shift register 340 as a second de-compression data signal DDATA. That is, when a flag signal has a value of '0', the selector 330 may select the first de-compression signal DHDATA; when a flag signal has a value of '1', the selector 330 may select the first de-compression signal DVDATA as a second de-compression data signal DDATA.

The shift register 340 may sequentially shift and latch the second de-compression data signal DDATA during a horizontal period (e.g., 1H). The shift register 340 may include 'm/4' delay circuits DLY1 to DLYm/4, each of which includes four delays D. The delays D of each of the delay circuits DLY1 to DLYm/4 may be coupled in parallel, and the delay circuits DLY1 to DLYm/4 may be coupled in series. Thus, a sequential delay on second de-compression data signals DDATA corresponding to four pixels may be made in parallel by the shift register 340 so as to be output as a previous data signal PDATA.

Meanwhile, a second de-compression data signal DDATA output from a first delay circuit DLY1 may be provided to a latch circuit 350 as output data signals D1 through Dm. If all the output data signals D1 through Dm are received, the latch circuit 350 may provide the output data signals D1 through Dm to a digital-to-analog converter 360. The digital-to-analog converter 360 may convert the previous data signal PDATA into a gradation voltage. An output buffer 370 may drive data lines DL1 to DLm with the gradation voltage from the digital-to-analog converter 360.

Figure 7:
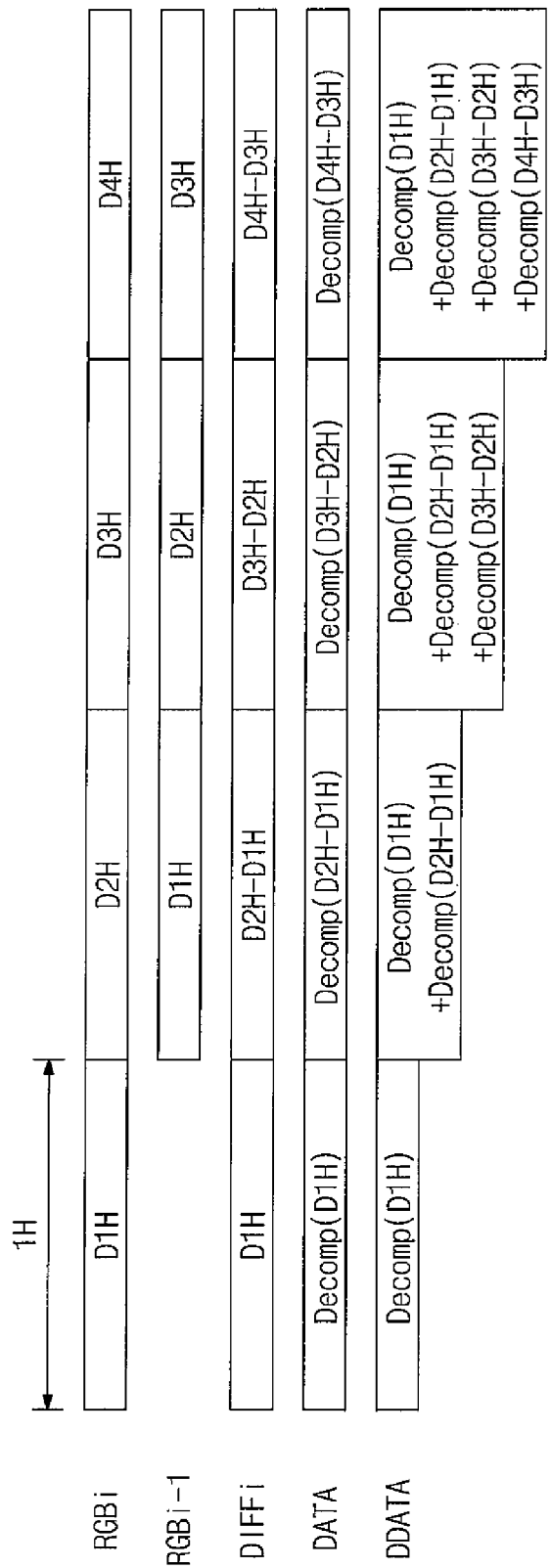
FIGS. 7 and 8 are diagrams showing a comparison on a second de-compression data signal de-compressed by the data driver shown in FIG. 1 according to whether the timing controller shown in FIG. 3 includes a first de-compressor.
Figure 8:
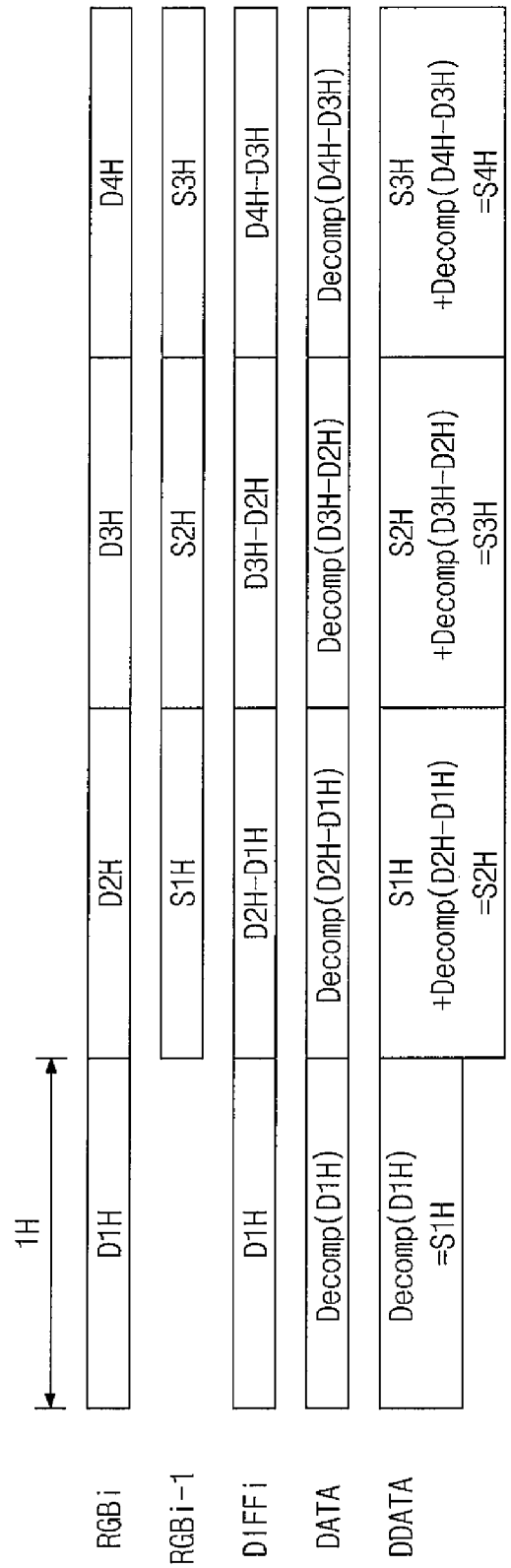

FIGS. 7 and 8 are diagrams showing a comparison on a second de-compression data signal de-compressed by a data driver (shown, e.g., in FIG. 1) according to whether a timing controller (shown, e.g., in FIG. 3) includes a first de-compressor.

Referring to FIGS. 3, 4, and 7, a data signal DATA output from a timing controller 120 may be compressed by a second compressor 230. The data signal DATA output from the timing controller 120 may be compressed according to an image signal RGBi, but a difference between the data signal DATA and the image signal RGBi may exist. In the event that the timing controller 120 stores the data signal DATA from a compression selector 240 in a memory 280 without de-compression, a difference between the image signal RGBi and the compressed data signal DATA may be accumulated on a second de-compression data signal DDATA de-compressed by a data driver 140.

Referring to FIGS. 3, 4, and 8, in the event that a data signal DATA output from the timing controller 120 according to embodiments of the present invention is de-compressed and a de-compressed result is stored in the memory 280, a previous image signal RGBi-1 read from the memory 280 may be matched with a second de-compression data signal DDATA de-compressed by the data driver 140. In this case, it may be possible to minimize or reduce a difference caused in the event that a first de-compression data signal de-compressed by the timing controller 120 is stored in the memory 280.

Figure 9:
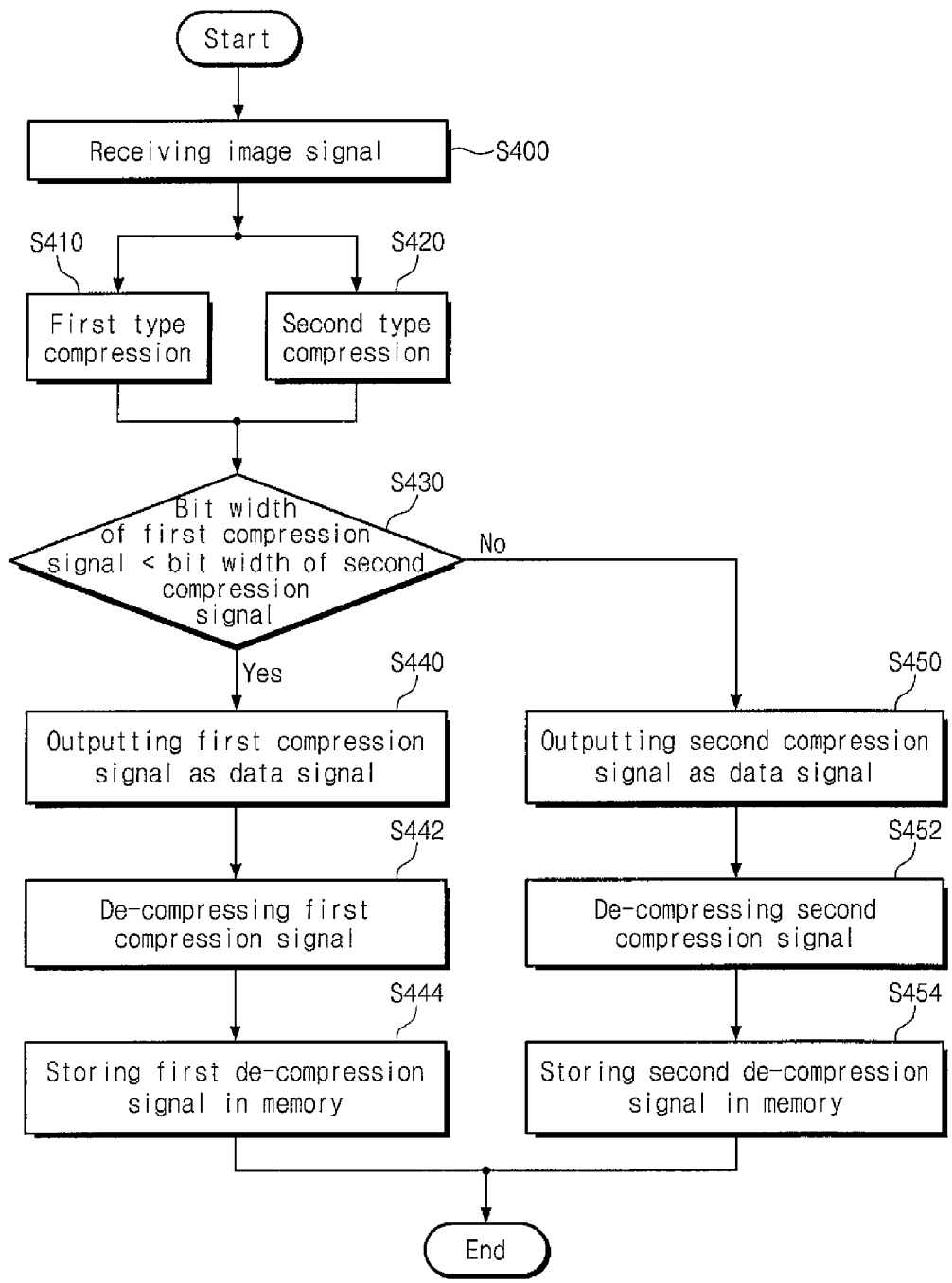
FIG. 9 is a flow chart schematically illustrating a compression driving method of a display device according to an embodiment of the present invention.

FIG. 9 is a flow chart schematically illustrating a compression driving method of a display device according to an embodiment of the present invention. For ease of description, a driving method of a display device will be described with reference to a structure of a timing controller shown in FIG. 3.

Referring to FIGS. 3 and 9, in step S400, an input buffer 210 of the timing controller 120 may receive a current image signal RGBi. In step S410, a first compressor 220 may compress the current image signal RGBi from the input buffer 210 and may output a first compression signal HRGBi as a compression result. In example embodiments, the first compressor 220 may be a variable length coding compressor that encodes a difference between current image signals RGBi corresponding to pixels adjacent along a first direction X1 (refer to FIG. 2). The first compressor 220 may be characterized in that a compression level is high when correlation (i.e., horizontal correlation) between pixels adjacent along the first direction X1 is high.

In step S420, a second compressor 230 may receive the current image signal RGBi provided from the input buffer 210 and a previous image signal RGBi-1 provided from the memory 280 and may output a second compression signal VRGBi. In example embodiments, the second compressor 230 may be a variable length coding compressor that encodes a difference between current image signals RGBi corresponding to pixels adjacent in a second direction X2 (refer to FIG. 2). The second compressor 230 may be characterized in that a compression level is high when correlation (i.e., horizontal correlation) between pixels adjacent in the second direction X2 is high.

In step S430, a compression selector 240 may compare a bit width of the first compression signal HRGBi from the first compressor 220 with a bit width of the second compression signal VRGBi from the second compressor 230. If the bit width of the first compression signal HRGBi is narrower than that of the second compression signal VRGBi, the method proceeds to step S440. In step S440, a flag bit may be set to '0', and the first compression signal HRGBi may be output as a data signal DATA.

In step S442, a first de-compression circuit DEC1 may de-compress the data signal DATA and may output a first de-compression data signal DRGBi. In step S444, the first de-compression data signal DRGBi may be stored in a memory 280.

If the bit width of the first compression signal HRGBi is wider than that of the second compression signal VRGBi, the method proceeds to step S450. In step S450, a flag bit may be set to '1', and the second compression signal VRGBi may be output as the data signal DATA.

In step S452, the first de-compression circuit DEC1 may de-compress the data signal DATA and may output the second compression signal VRGBi. In step S454, the second compression signal VRGBi may be stored in the memory 280.

Figure 10:
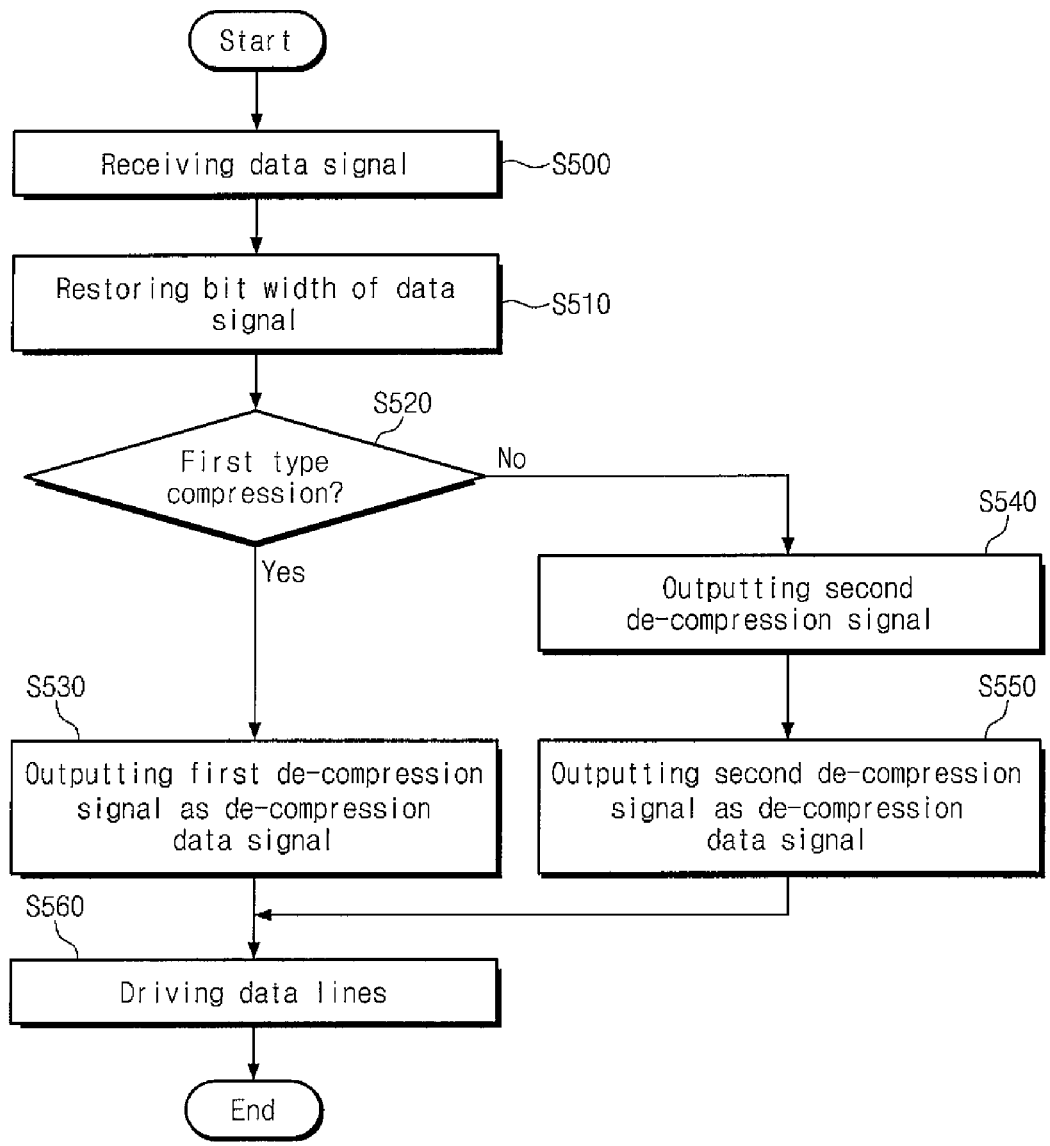
FIG. 10 is a flow chart schematically illustrating a de-compression driving method of a display device according to an embodiment of the present invention.
Figure 5:
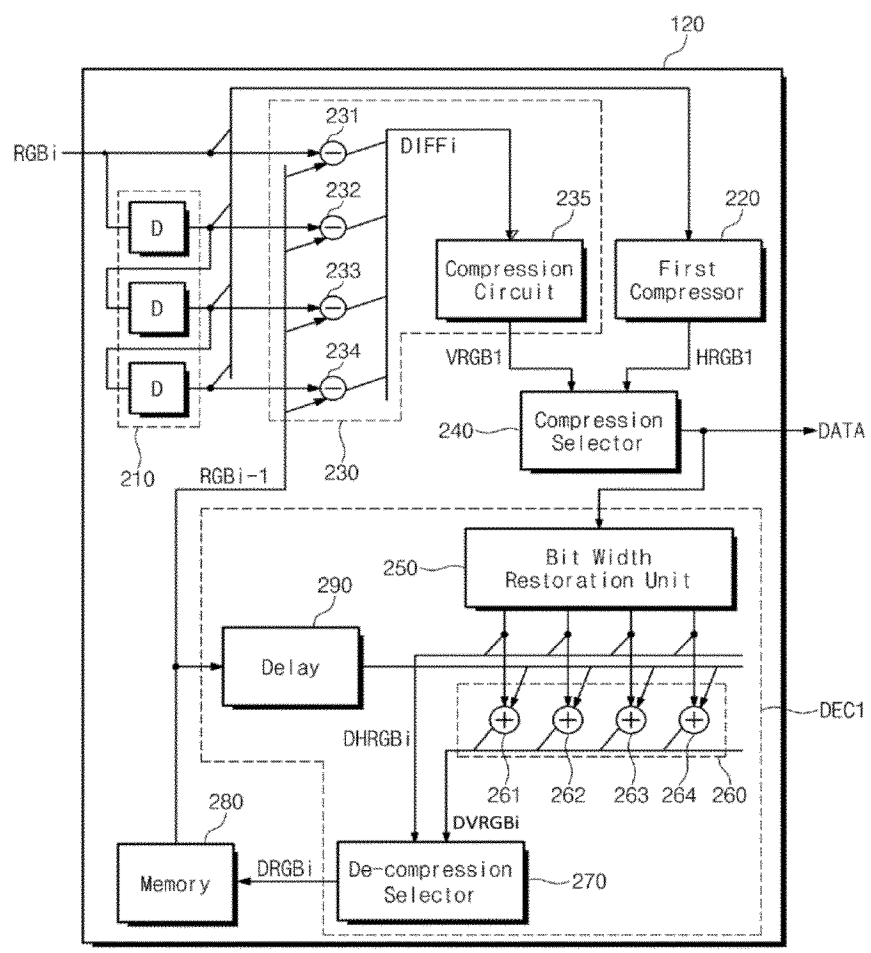

FIG. 10 is a flow chart schematically illustrating a de-compression driving method of a display device according to an embodiment of the present invention. For ease of description, a driving method of a display device will be described with reference to a structure of a data driver shown in FIG. 4.

Referring to FIGS. 4 and 10, in step S550, a second de-compression circuit DEC2 of a data driver 140 may receive a data signal DATA from a timing controller 120 shown in FIG. 3. In step S510, a bit width restoration unit 310 of the second de-compression circuit DEC2 may convert a bit width of the data signal DATA into a bit width of an image signal RGBi. If the data signal DATA has a flag bit of '0', a first de-compression signal DHDATA may be output by performing conversion of a bit width and de-compression according to the data signal DATA.

If the data signal DATA has a flag bit of '1', the bit width restoration unit 310 may convert a bit width of the data signal DATA into a bit width of the image signal RGBi and may output a resultant signal to a de-compressor 320. The de-compressor 320 may output a first de-compression signal DVDATA that is de-compressed according to a previous data signal PDATA from a shift register 340 and a signal the bit width of which is converted by the bit width restoration unit 310.

In step S520, a selector 340 may determine a compression type (e.g., compression scheme) according to a flag bit included in the first de-compression signal DHDATA. If the data signal DATA has a flag bit of '0', in step S530, the selector 340 may determine a compression scheme as a first compression scheme and may output the first de-compression signal DHDATA as a second de-compression data signal DDATA. If the data signal DATA has a flag bit of '0', in step S540, the selector 340 may select the first de-compression signal DVDATA as a second de-compression data signal DDATA.

A shift register 340 may sequentially shift and latch the second de-compression data signal DDATA during a horizontal period, that is, 1H. previous data signal PDATA output from the shift register 340 may be latched by a latch circuit 350. digital-to-analog converter 360 may convert the previous data signal PDATA into a gradation voltage. An output buffer 370 may drive data lines DL1 to DLm (refer to FIG. 2) with the gradation voltage from the digital-to-analog converter 360. That is, in step S560, a data line driving operation may be performed.

As illustrated in FIGS. 9 and 10, a timing controller 120 may transfer a compressed data signal DATA to a data driver 140, and the data driver 140 may de-compress the compressed data signal DATA such that an image corresponding to the de-compressed image signal is displayed on a display panel 110 (refer to FIG. 2). data signal DATA compressed by the timing controller 120 may be transferred to the data driver 140, so the amount of data signal DATA may be reduced. Accordingly, it may be possible to reduce the number of data driver integrated circuits 141 to 144 of the data driver 140.

While the present invention has been described with reference to example embodiments, it will be apparent to those skilled in the art that various changes and modifications may be made without departing from the spirit and scope of the present invention. Therefore, it should be understood that the above embodiments are not limiting, but illustrative.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with an example embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of embodiments of the present invention as set forth in the following claims, and their equivalents.

What is claimed is:
1. display device comprising:
a display panel comprising a plurality of pixels coupled to a plurality of gate lines and a plurality of data lines, respectively;
a gate driver configured to drive the plurality of gate lines;
a data driver configured to drive the plurality of data lines; and
a timing controller configured to control the gate driver and the data driver and to provide the data driver with a data signal generated by compressing an image signal received from an external device,
wherein the timing controller is configured to compress the image signal according to a first compression scheme and a second compression scheme to generate a first compression signal and a second compression signal, respectively, and
wherein the timing controller is configured to select whichever one, from among the first compression signal and the second compression signal, that has a relatively narrower bit width as the data signal,
wherein the timing controller comprises:
a first de-compression circuit configured to de-compress the data signal to generate a first de-compression data signal before compression;
a first compressor configured to compress the image signal according to the first compression scheme and to output the first compression signal;

a second compressor configured to receive the image signal and the first de-compression data signal and to compress the image signal according to the second compression scheme and to output the second compression signal; and a compression selector configured to select whichever one, from among the first compression signal and the second compression signal, that has the relatively narrower bit width.

2. The display device of claim 1, wherein the timing controller further comprises:

a memory configured to store the first de-compression data signal from the first de-compression circuit, wherein the second compressor is configured to receive the first de-compression data signal from the memory.

3. The display device of claim 2, wherein the first compressor is configured to output the first compression signal using a difference between image signals corresponding to a group of pixels, adjacent along a first direction, from among the plurality of pixels.

4. The display device of claim 2, wherein the second compressor is configured to output the second compression signal using a difference between the image signal and a previous image signal.

5. The display device of claim 2, wherein the compression selector is configured to add a flag bit corresponding to one selected from the first compression signal and the second compression signal to the data signal, and to transfer a resultant signal to the data driver.

6. The display device of claim 5, wherein the first de-compression circuit comprises:

a bit width restoration unit configured to restore a bit width of the data signal;

a delay configured to delay a previous image signal received from the memory;

a de-compressor configured to output a de-compression signal based on the previous image signal delayed by the delay and the data signal the bit width of which is restored by the bit width restoration unit; and a first de-compression selector configured to store one of the de-compression signal and the data signal in the memory based on the flag bit.

7. The display device of claim 5, wherein the data driver comprises:

a second de-compression circuit configured to de-compress the data signal and to output a second de-compression data signal as a de-compression result;

a shift register configured to store the second de-compression data signal; and a driver circuit configured to drive the plurality of data lines based on the second de-compression data signal.

8. The display device of claim 7, wherein the second de-compression circuit comprises:

a bit width restoration unit configured to restore a bit width of the data signal;

a de-compressor configured to output a de-compression signal based on the second de-compression data signal stored by the shift register and the data signal the bit width of which is restored by the bit width restoration unit; and a second de-compression selector configured to output one of the de-compression signal and the data signal as the second de-compression data signal.

9. The display device of claim 7, wherein the driver circuit comprises:

a latch configured to latch the second de-compression data signal;

a digital-to-analog converter configured to receive the second de-compression data signal from the latch, convert the second de-compression signal into an analog signal, and output a gradation signal; and an output buffer configured to receive the gradation signal from the digital-to-analog converter and to provide the gradation to the plurality of data lines.

10. The display device of claim 1, wherein the data signal output from the timing controller has a fixed bit width.

11. The display device of claim 1, wherein the data driver comprises a plurality of data driver integrated circuits.

12. driving method of a display device, the driving method comprising:

receiving, by a timing controller, an image signal;

generating a first compression signal by compressing the image signal according to a first compression scheme;

generating a second compression signal by compressing the image signal according to a second compression scheme; and outputting, to a data driver, whichever one, from among the first compression signal and the second compression signal that has a relatively narrower bit width, as a data signal, restoring a bit width of the data signal;

outputting a de-compression signal based on a previous de-compression data signal and the data signal the bit width of which is restored; and storing the de-compression signal.

13. The driving method of claim 12, wherein the outputting comprises:

adding a flag signal corresponding to one selected from the first compression signal and the second compression signal to the data signal.

* * * * *

UNITED STATES PATENT AND TRADEMARK OFFICE
CERTIFICATE OF CORRECTION

PATENT NO.       : 9,530,383 B2  
APPLICATION NO.  : 14/302214  
DATED            : December 27, 2016  
INVENTOR(S)      : Tadashi Amino Page 1 of 2

It is certified that error appears in the above-identified patent and that said Letters Patent is hereby corrected as shown below:

In the Drawings

FIG. 5, Sheet 5 of 10 (beneath Ref. No. 261)   Delete "DVHRGBi",

Insert --DVRGBi--

Delete Drawing Sheet 5 and substitute therefore the Drawing Sheet, consisting of FIG. 5, as shown on the attached page In the Claims Column 14, Line 41, Claim 1   Before "display device", Insert --A--

Column 16, Line 29, Claim 12   Before "driving method",

Insert --A--

Signed and Sealed this  
Sixth Day of August, 2019

Andrei Iancu  
*Director of the United States Patent and Trademark Office*